(12) United States Patent
Katiyar et al.

(10) Patent No.: US 7,180,030 B2
(45) Date of Patent: Feb. 20, 2007

(54) METHOD FOR RATING AND/OR RANKING WELDING ELECTRODES

(75) Inventors: Rajeev Katiyar, Mentor, OH (US); Garr Eberle, Parma, OH (US)

(73) Assignee: Lincoln Global, Inc., City of Industry, CA (US)

( * ) Notice: Subject to any disclaimer, the term of this patent is extended or adjusted under 35 U.S.C. 154(b) by 99 days.

(21) Appl. No.: 11/109,577

(22) Filed: Apr. 19, 2005

(65) Prior Publication Data

US 2006/0231539 A1   Oct. 19, 2006

(51) Int. Cl.
*B23K 9/24*   (2006.01)
(52) U.S. Cl. .............................. 219/137 R; 219/145.22
(58) Field of Classification Search ............ 219/137 R, 219/145.22; 228/103
See application file for complete search history.

(56) References Cited

U.S. PATENT DOCUMENTS 3,542,998 A * 11/1970 Huff ...................... 219/145.22

* cited by examiner

*Primary Examiner*—Clifford C. Shaw
(74) *Attorney, Agent, or Firm*—Fay, Sharpe, Fagan, Minnich & McKee, LLP (57) ABSTRACT

Methods are disclosed for rating a welding electrode and/or for ranking two or more electrodes with respect to gas tracking effects in gas shielded flux cored arc welding processes. The methods involve performing a standardized welding process using an electrode of interest to create a test weld on a workpiece with a linearly varying contact to work distance in the process, measuring a distance from the beginning of the weld to a point at which gas tracking is first observed, and rating an electrode or ranking several electrodes according to the measured distance.

42 Claims, 5 Drawing Sheets

METHOD FOR RATING AND/OR RANKING WELDING ELECTRODES

FIELD OF THE INVENTION

The present invention relates generally to arc welding technology, and more particularly to methods for rating and/or ranking welding electrodes with respect to gas tracking.

BACKGROUND OF THE INVENTION

Cored welding electrodes are consumable welding devices with a tubular core surrounded by an outer sheath, where the core may include fluxing elements, deoxidizing and denitriding agents, and alloying materials, as well as elements that increase toughness and strength, improve corrosion resistance, and stabilize a welding arc. Flux-cored electrodes include flux within the electrode core to produce an extensive slag cover during welding, which supports and shapes the resulting weld bead. Flux cored arc welding (FCAW) processes employ flux-cored electrodes to provide higher deposition rates than those of other processes without developing excessive electrical resistance heating, even with relatively small diameter electrodes, wherein FCAW is widely used for welding large sections and with materials of great thicknesses and lengths, especially in the flat position. During FCAW processes, the flux from the electrode core produces a slag which covers the weld pool as it is solidifying to protect the weld pool from impurities. Flux cored arc welding is typically an automatic or semi-automatic process having several advantages. Because the process is machine controlled, the weld quality is consistent with fewer defects than manual welding processes. In addition, FCAW allows the use of higher currents and thus facilitates increased weld rates and improved productivity, wherein distortion can be reduced because of lower heat input and higher lineal welding speeds. FCAW may be performed with no shielding gas, a process sometimes referred to as "Innershield" or "self-shielding" (FCAW-S). In such self-shielded FCAW, the heat of the arc causes decomposition and some vaporization of the electrode's flux core, which partially protects the molten metal. Gas shielded flux-cored arc welding (FCAW-G, also known as "Outershield") employs an external shielding gas, such as argon, carbon dioxide ($CO_2$), or mixtures thereof in conjunction with a flux cored electrode. The combination of a flux inside the electrode core and the external shielding gas yields a good weld from a stable arc with very little spatter. The most widely used shielding gas is $CO_2$, but mixtures of argon and $CO_2$ are becoming more common because the argon gas improves the properties of the weld and provides rapid deposition of metal and high-quality welds in steel. Relatively long electrode extensions or stick-out distances may be employed to preheat the electrode and decrease the welding current, thereby producing a shallow penetrating welding bead. Various types of flux-cored welding electrodes are designed for specific gas-shielded FCAW applications, such as highspeed, single-pass welding, general purpose welding, structural fabrication, and high-strength pipe welding, wherein the constituent materials used in the core and the electrode diameters may be tailored for a given situation.

One problem encountered in gas-shielded FCAW is variously referred to as "gas tracking", "gas marking", or "worm tracking", in which so-called gas marks or tracks appear as a series of depressions in the shape of a "worm" on the weld surface. Gas tracking is the result of gases being trapped under the slag as the weld solidifies, and is most commonly observed when welding at high welding travel speed using a high argon blend shielding gas, such as 75 percent Argon and 25 percent $CO_2$, and/or where small stickout distances are used, wherein the slag cools and solidifies before the gas can escape. One factor that may influence gas tracking is moisture in the flux core, which may be caused by a poor joint seal in the electrode manufacturing process, by storage of the electrode in a damp environment, or by the wire being unprotected when loaded on the wire feeder spool of the welding machine. Efforts to reduce gas marking may include using a higher mixture of $CO_2$ content in the shielding gas (e.g., lowering the argon content), cleaning the weld joint of paint, rust, and moisture, minimizing wind disturbance of the gas shielded FCAW process, removing spatter from inside the shielding gas nozzle, and/or increasing the flow rate of the shielding gas. In addition, preheating the flux cored electrode prior to use may help avoid gas tracking, along with using a slightly longer wire stick out to preheat the electrode and to reduce the potential for hydrogen contamination and gas tracking. Also, increased weld current, lowering the lineal welding travel speed, and/or increasing the weld size all may be used to combat gas tracking. In addition to these process modifications, the selection of flux-cored welding electrodes may affect the likelihood of gas-tracking for a given gas-shielded FCAW application. Accordingly, there is a need for methodologies by which flux-cored welding electrodes can be characterized or rated according to the propensity for gas tracking, by which the informed selection of welding electrodes can be facilitated for specific gas-shielded FCAW processes.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention provides techniques for standardized rating of a welding electrode with respect to gas tracking. In addition, the invention may be employed to facilitate comparison and ranking of two or more electrodes and to allow informed selection between competing welding electrodes for minimizing the likelihood of gas tracking for gas-shielded FCAW welding processes. In other applications, the invention is useful as a welding electrode design tool, wherein different proposed electrode designs can be objectively evaluated for relative performance according to standardized performance metrics during electrode product development.

In accordance with an aspect of the invention, a method is provided for rating a welding electrode for use in arc welding operations. The method comprises providing a workpiece with first and second ends and a substantially flat surface. A standardized welding process is performed using the welding electrode of interest to create a test weld extending from a weld beginning proximate the first workpiece end to a weld end proximate the second workpiece end on the workpiece surface. The standardized welding process can be any repeatable process that allows objective rating of the gas tracking performance of an electrode, such as a process that provides a linearly varying contact to work distance (CTWD) along the test weld with a CTWD value at the weld beginning and a second smaller CTWD value at the weld end. In one example, the standardized welding process maintains a relatively constant arc length along the test weld, and can be a gas-shielded FCAW process. In addition, any CTWD values may be used in creating the test weld, for example, where the first value is about one inch and the second value is about one half inch in one embodiment.

The method further includes measuring a distance from the weld beginning to a gas tracking point in the test weld at which gas tracking is first observed, and rating the welding electrode according to the measured distance. The use of substantially linearly varying CTWD provides a metric for standardized rating of the gas tracking performance of the welding electrode, where the CTWD values at the beginning and end the weld can be set so that gas tracking will ensue somewhere along the weld length, wherein the measured distance provides an objective indication of the propensity of the tested electrode to induce or influence gas tracking in welding operations using the electrode. In one implementation, the process may be repeated with the same electrode to create a plurality of test welds, with a distance being measured for each test weld to a point where gas tracking is observed, and the electrode is then rated based on an average of the measured distances. The workpiece surface may be descaled, for example, by grinding and/or sandblasting the workpiece surface prior to welding. The process may also be performed to assign ratings for other welding electrodes, with the electrodes being ranked according to their respective ratings.

Another aspect of the invention provides a method for ranking two or more welding electrodes, which method comprises providing a workpiece with first and second ends and a substantially flat workpiece surface extending therebetween, and performing a standardized welding process using first and second welding electrodes to create first and second test welds on the workpiece surface, where the welding process provides a substantially linearly varying CTWD along the length of the welds. A first distance is measured for the first test weld from the weld beginning to a gas tracking point at which gas tracking is first observed, a second distance is measured for the second test weld from the weld beginning to a gas tracking point at which gas tracking is first observed, and the first and second welding electrodes are ranked according to the measured distances. As with the above rating methodology, the ranking technique may also provide for repeating the welding process for each welding electrode to create a plurality of test welds for each electrode, with the electrodes being ranked according to the averages of the corresponding measured distances. The ranking methodology may alternatively be performed using separate workpieces for each welding electrode.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages and novel features of the invention will become apparent from the following detailed description of the invention when considered in conjunction with the drawings, in which.

DETAILED DESCRIPTION OF THE INVENTION

One or more implementations of the present invention are hereinafter described in conjunction with the drawings, wherein like reference numerals are used to refer to like elements throughout and wherein the illustrated structures are not necessarily drawn to scale. The invention relates to characterization and/or comparison of welding electrodes with regard to gas tracking in creating welds on a workpiece, and is hereinafter illustrated and discussed in the context of gas shielded welding processes employing flux cored electrodes, although the invention may be used to characterize electrodes of any type with respect to the electrode influence on gas tracking in gas shielded or other welding processes.

Figure 1:
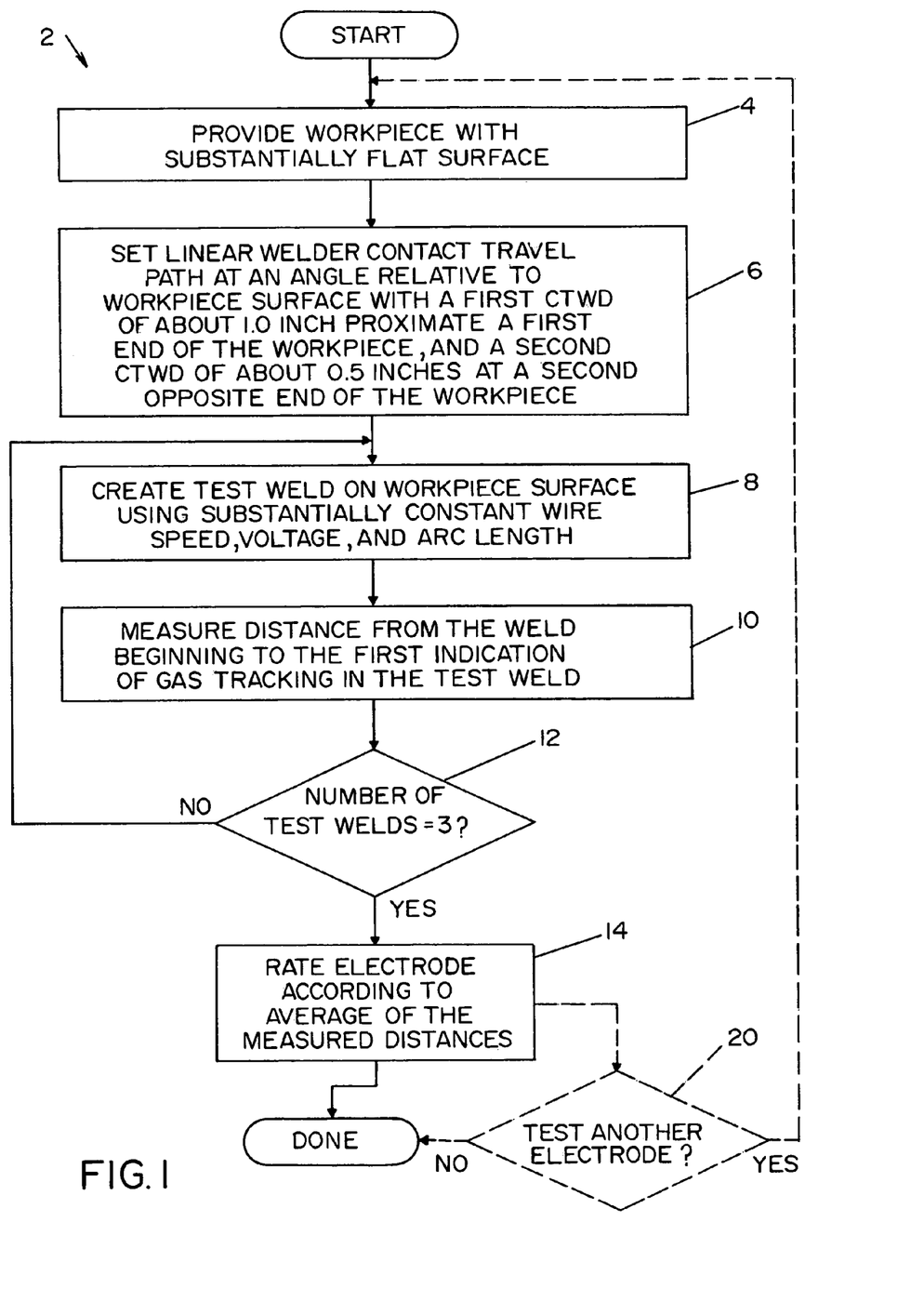
FIG. 1 is a flow diagram illustrating an exemplary method of rating a welding electrode and/or ranking multiple electrodes with respect to gas tracking according to one or more aspects of the present invention.

Referring initially to FIG. 1, a welding electrode rating method 2 is illustrated, which may also be used for providing a comparative ranking of two or more electrodes with respect to gas tracking. The exemplary process or method 2 is illustrated and described below as a series of acts or events. However, the methods of the present invention are not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Moreover, the methods of the invention may be carried out in conjunction with various welders, welding electrodes, systems, and workpieces illustrated and described herein, as well as in association with other structures, systems, or electrodes that are not illustrated or specifically discussed.

The method 2 may be used for quantifying or rating the gas tracking performance of a given welding electrode in a standardized objective manner, and/or for characterizing relative gas tracking performance of any two or more electrodes, wherein one or more tests are undertaken to ascertain the onset of observed gas tracking effects along the length of test welds created using a substantially linearly varying contact to work distance (CTWD). In this regard, the inventors have appreciated that arranging a travel path of a welder and a substantially flat workpiece surface in a non-parallel relative orientation can provide a repeatable process for generating test welds with a linear CTWD profile while the other welding process parameters are maintained essentially constant, such that the welder contact is closer and closer to the workpiece with increasing weld length. In this manner, the linearly decreasing CTWD provides ever increasing likelihood of the above described gas tracking phenomenon, in which quickly solidifying slag from the electrode flux core traps process gases between the weld metal and the slag, leading to undesirable depressions in the finished weld bead. Moreover, the measured distance from the beginning of the test weld to the observable start of the gas tracking depressions can be quantified for a single test weld or averaged for multiple welds created using the electrode of interest, wherein longer measured distances indicate less likelihood of gas tracking in actual welding applications, whereas shorter measured distances indicate a higher likelihood of gas tracking when using the tested electrode. Furthermore, the methods of the invention provide for objective comparative analysis of two or more welding electrodes with respect to gas tracking, wherein the electrode more prone to gas tracking can be identified as that for which the shortest distances are measured, whereby an informed decision can be made as to which electrode to employ for a given welding application based on ranking of the relative performance of the electrodes of interest.

Figure 2:
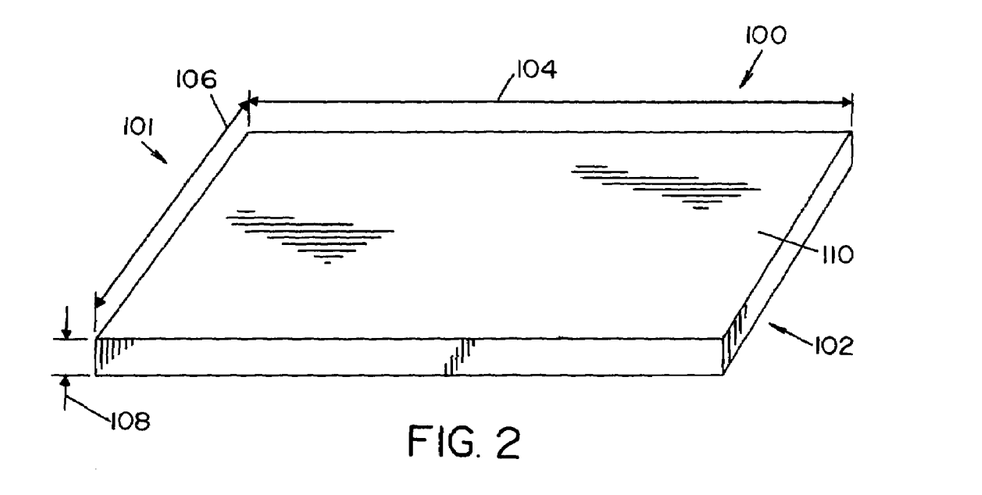
FIG. 2 is a perspective view illustrating an exemplary test workpiece that may be used in performing the methods of the invention.

The method 2 begins at 4 with provision of a test workpiece having first and second ends and a substantially flat workpiece surface extending therebetween. FIG. 2 illustrates one possible test workpiece 100 having first and second opposite longitudinal ends 101 and 102, respectively, a longitudinal length 104, a width 106, and a thickness or height 108, with a substantially flat upper workpiece surface 110 extending between the ends 101 and 102. The workpiece 100 may be made from any suitable material or materials, such as an A36 grade steel plate with a length 104 of about 24" and a thickness 108 of 0.75 or 1.00 inches in one example. Moreover, the workpiece may be of any suitable shape having at least one generally flat surface upon which test welds may be made with a linearly varying CTWD, wherein the invention is not limited to strictly rectangular workpieces. The workpiece 100 is preferably cleaned or descaled before welding, for example, by sandblasting or grinding the upper workpiece surface 110, or other suitable descaling process or technique.

Referring also to FIG. 2–5, a welder and the workpiece 100 are located at 6 in the method 2 so as to provide a substantially linearly varying CTWD along the longitudinal direction, in this example, by setting a travel path of the welder contact at an angle relative to the workpiece surface 110. In this manner, a standardized welding process can be performed as shown in FIGS. 3 and 4A–4D with a first contact to work distance CTWD1 (the distance from a welder contact C to the workpiece surface 110 in FIG. 4A) at a weld beginning near the first end 101 and a second smaller contact to work distance CTWD2 at a weld end proximate the second workpiece end 102 (FIG. 4D), where the CTWD varies substantially linearly from the weld beginning to the weld end. In one example, the welder is situated to provide a generally horizontal longitudinal travel path for the contact C and the welding electrode E with the workpiece 100 being situated at a slight angle to the horizontal using a backup bar or other support (not shown) under the second end 102 of the workpiece 100, whereby the second end 102 is raised by a distance 112 relative to the first end 101. However, the invention is not limited to the illustrated and described setup, and any configuration can be used which provides a generally linear CTDW variance along the length of the test welds to be subsequently created using a standardized welding process. Furthermore, the workpiece surface 110 need not be exactly flat or planar and the CTWD variance need not be strictly linear within the scope of the invention, wherein any substantially linear variation can be employed by any means or setup which allows objective rating of an electrode performance regarding gas tracking and/or which facilitates objective differentiation between different electrodes having different propensities for gas tracking or different impacts on gas tracking in a welding operation. In the illustrated implementation of FIGS. 2–5, the second workpiece end 102 is situated a distance 112 of about 0.5 inches higher than the first end 101, for instance, using a half inch backup plate (not shown) under the second end 102, and the welder travel path is set so that the contact to workpiece distance CTWD varies linearly from a first distance CTWD1 of about 1.0 inches at the first end 101 to a second distance CTWD2 of about 0.5 inches at the second end 102 with the subsequent test welds 120 being created along essentially the entire length 104 of the workpiece 100, although these values are but one example within the scope of the invention.

Figure 4A:
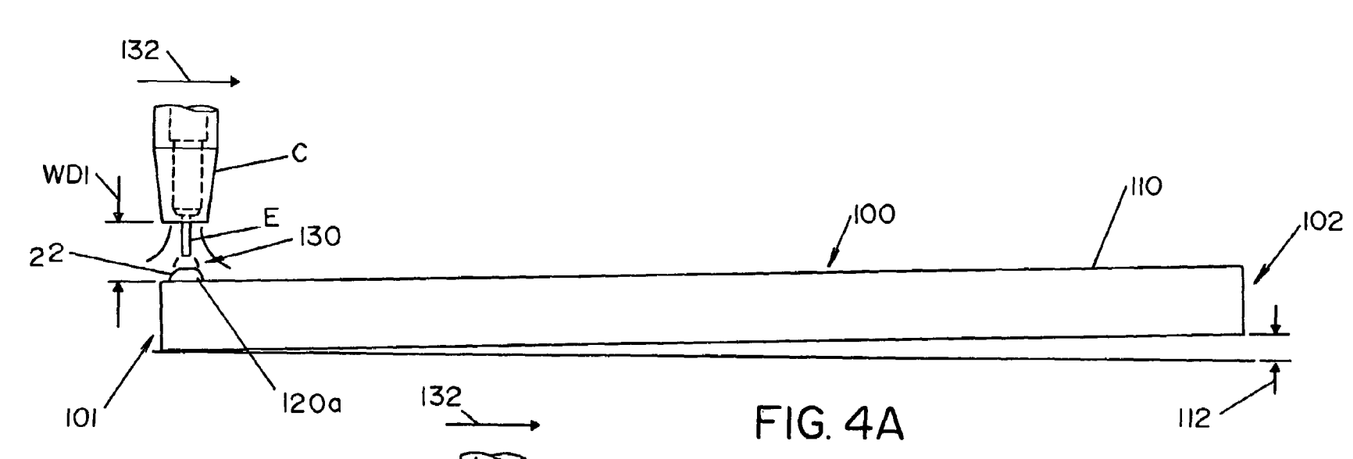
FIGS. 4A–4D are side elevation views illustrating creation of a test weld on the workpiece of FIGS. 2 and 3 at various exemplary points showing the substantially linear variation in contact to work distance along the test weld length.

The method 2 of FIG. 1 continues at 8 with the creation of one or more test welds 120 on the workpiece surface 110. As shown in FIGS. 4A–4D, a standardized welding process or operation 130 is performed using the electrode E of interest to create a test weld 120a with a weld beginning 122 near the first end 101 with a first contact to work distance CTWD1 at a beginning 122 of the weld as shown in FIG. 4A. In accordance with the present invention, the standardized welding process 130 can be any type of welding process in which gas tracking is possible (e.g., gas-shielded flux-cored arc welding, etc.), and which can be repeated to provide objective ratings and/or rankings to quantify and/or distinguish the gas tracking performance of one or more different electrodes E. In this regard, the standardized process can be automatic, semi-automatic, manual, etc. within the scope of the invention. In the illustrated example, the process 130 employs an automatic FCAW welding setup using an NA-5 feeder, a Spreadarc oscillator, and a model DC 400 or larger transformer type welding machine available from the Lincoln Electric Company of Cleveland, Ohio, although any suitable equipment may be employed within the scope of the invention. The exemplary process 130 uses a "bent" tip with a gun angle adjusted to ensure that the welding electrode E is fed generally vertically, with other process parameters or settings (e.g., type of gas blend, electrode diameter, wire feed speed, voltage, and travel speed) being adjusted according to a particular application for which the ratings may be used to select an electrode E.

Figure 4B:
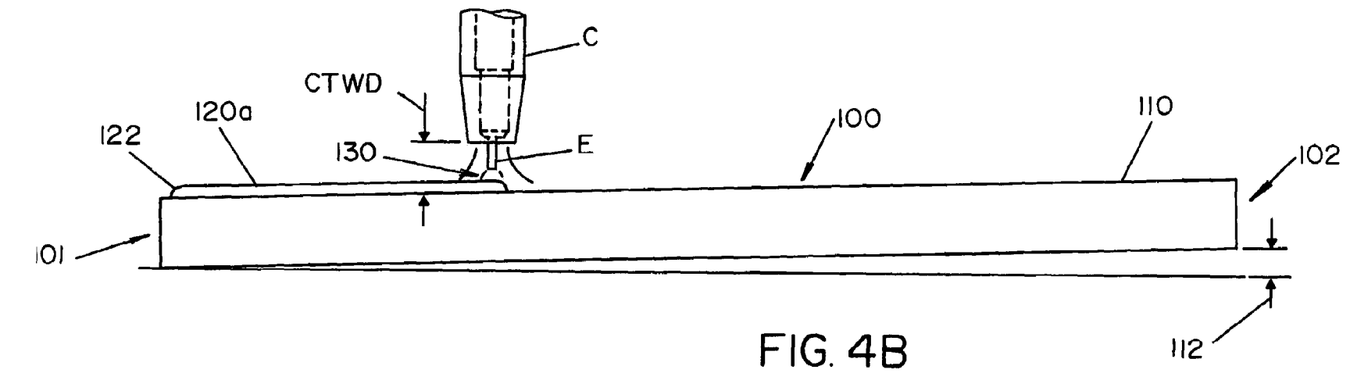
Figure 4C:
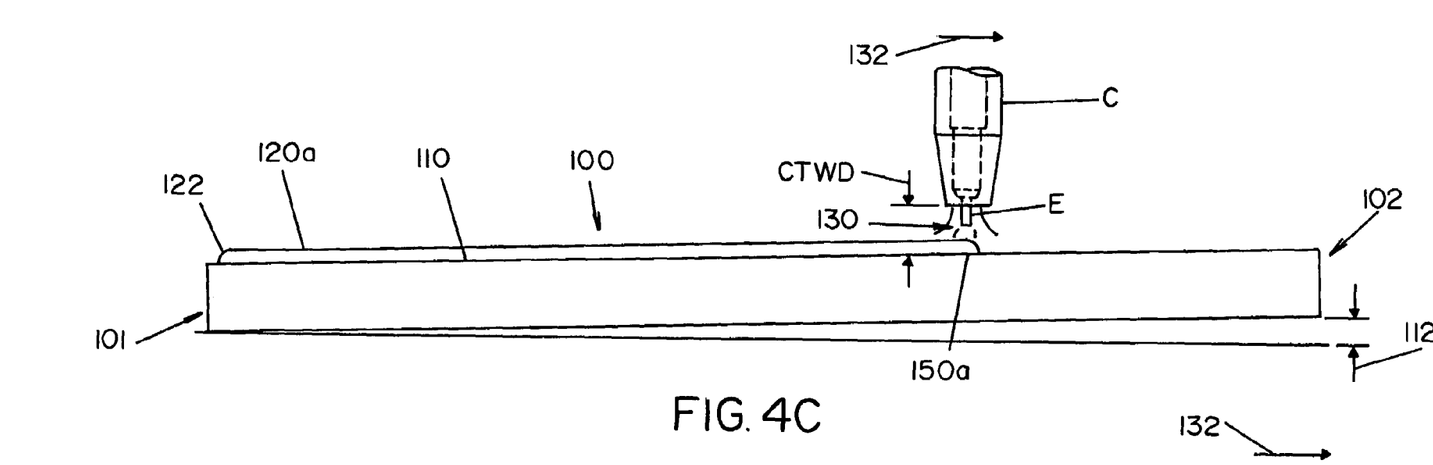
Figure 4D:
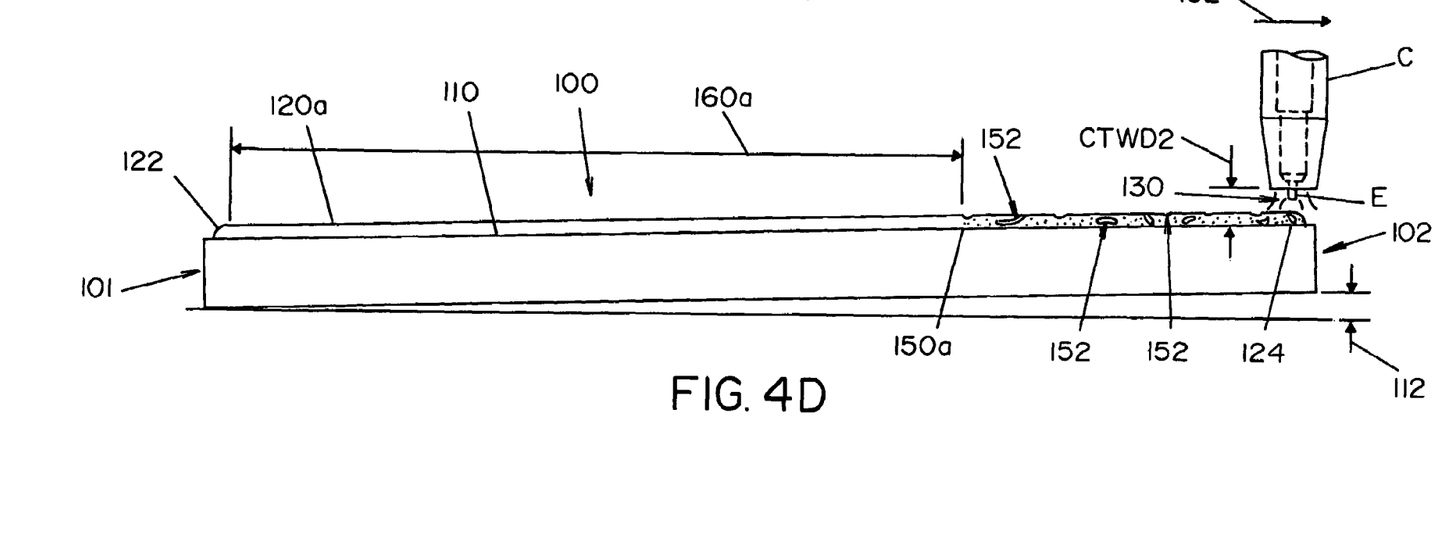

The standardized welding process 130 continues in FIGS. 4B–4D with the welder contact C and electrode E being translated in a generally horizontal longitudinal direction 132 toward the second workpiece end 102 in order to create a first test weld 120a on the workpiece having a beginning 122 at the first end 101 and a weld end 124 (FIG. 4D) near the second workpiece end 102. It is noted in FIGS. 4A–4D that the tilting of the workpiece 100 causes the travel direction 132 of the welder contact C to be at an angle relative to the workpiece surface 110 whereby the contact to work dimension CTWD decreases substantially linearly from the weld beginning 122 to the weld end 124. Other configurations of the workpiece 100 and the travel path 132 of the welder contact C and electrode E are possible within the scope of the invention by which a generally linear variation in CTWD is achieved. In one preferred implementation, the welding process 130 employs a generally constant voltage and wire feed speed, with the welding current being controlled to provide a substantially constant arc length. In this regard, as the CTWD decreases along the length of the test weld 120a, the use of a constant arc length means that the stick-out distance will also decrease in a generally linear fashion as the process 130 proceeds, wherein the resulting weld 120a is created with relatively high puddle temperature near the first workpiece end 101 and lower temperature near the second end 102. Thus, the inventors have appreciated that the illustrated setup and process 130 will be more conducive to fast slag freezing at the second end 102 than at the first end 101, particularly where the arc length is held relatively constant, since the puddle is hotter for longer at the beginning of the weld 120, thus providing a high probability of process gases escaping prior to slag and weld pool solidification. Conversely, the relatively cooler puddle temperature at the end of the weld will tend to maximize the likelihood that gas will be trapped between the weld puddle and the solidified slag, resulting in a higher probability of gas tracking effects, wherein the welding process 130, the workpiece parameters, and other testing conditions are preferably set such that gas tracking ensues somewhere along the length of the test weld 120a, and thus it is preferable to provide a test workpiece 100 of sufficient length 104 to provide a more accurate rating for a given electrode E and/or to better facilitate differentiation between various electrodes E using a selected standardized welding process 130.

Figure 3:
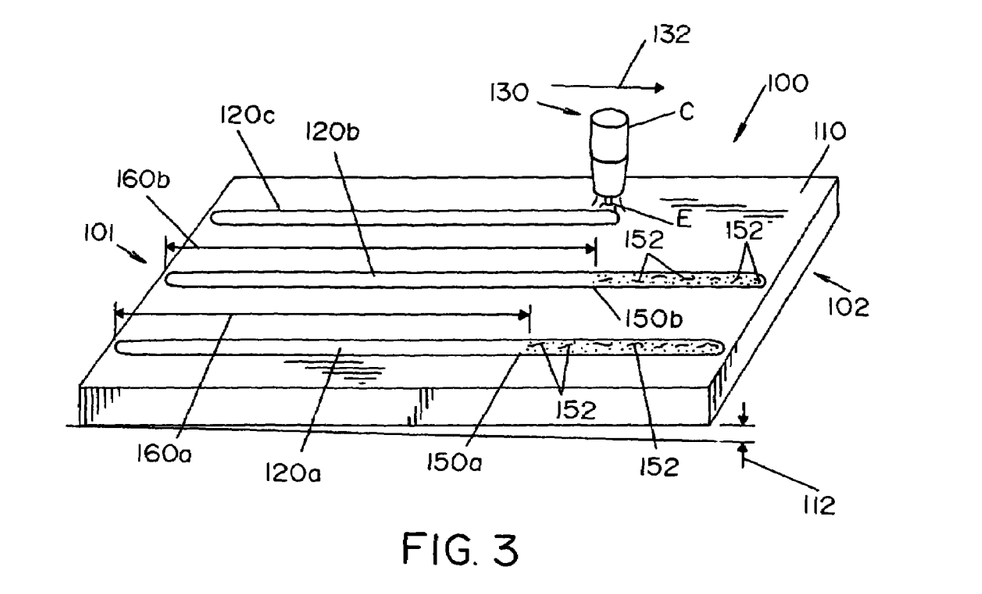
FIG. 3 is a perspective view illustrating creation of test welds on an upper surface of the workpiece of FIG. 2, where the test welds include a measurable distance from the weld beginning to the onset of gas tracking according to the invention.
Figure 5:
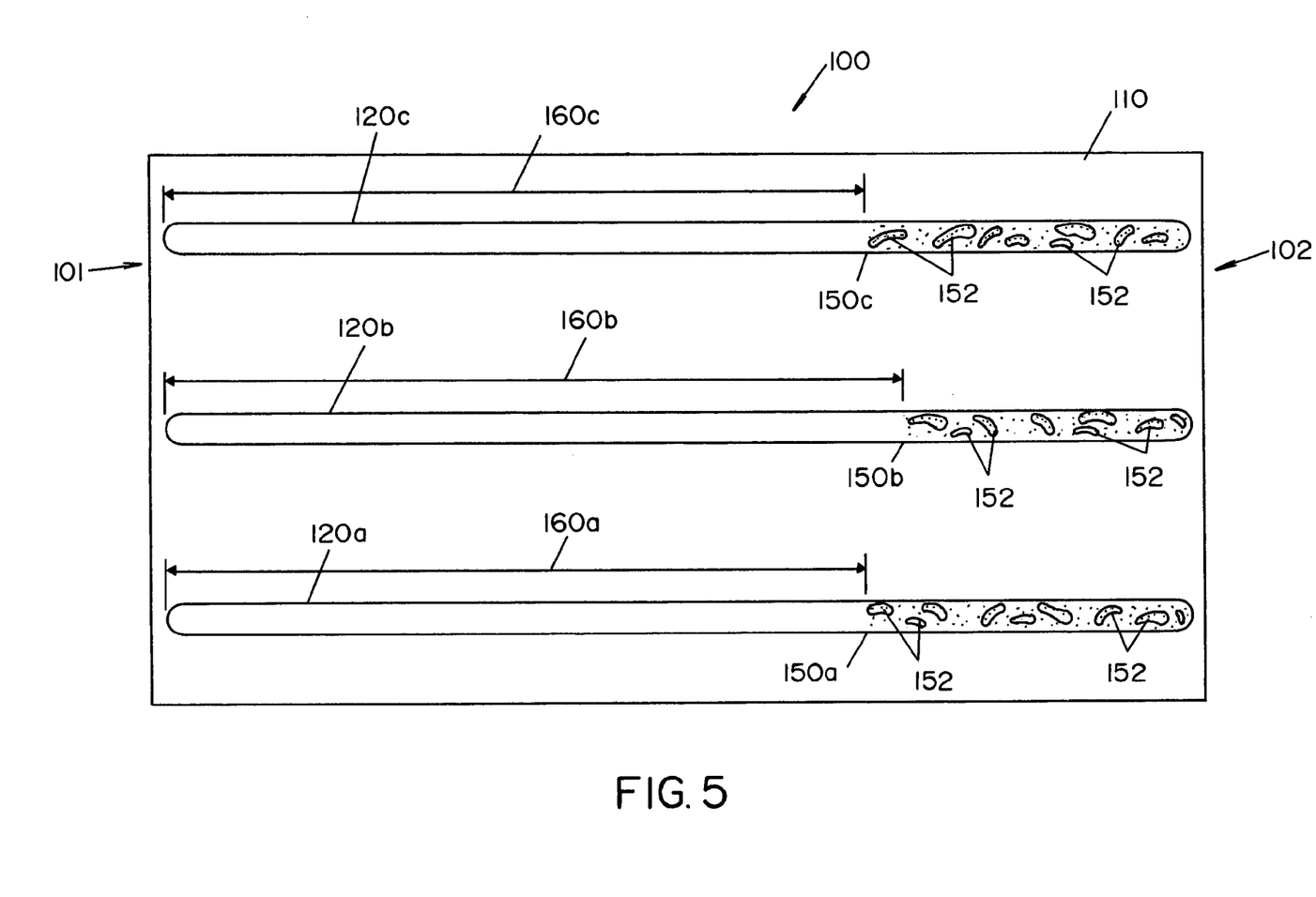
FIG. 5 is a top plan view of the test workpiece of FIGS. 2–4D showing several test welds and the measured distances to the onset of gas tracking in accordance with the invention.

Returning to the method 2 of FIG. 1, once the test weld 120a has been completed at 8, a distance 160a is measured at 10 from the beginning 122 of the weld to a point 150a along the length of the test weld 120a at which the presence of gas tracking marks or recesses 152 are first observable (FIGS. 3, 4D, and 5). The measurement at 10 can be made manually or in automated fashion using any suitable distance measurement apparatus or techniques within the scope of the invention. In one implementation of the invention, the method 2 ends at this point with the electrode E being rated according to the distance 160a measured at 10. For example, the tested electrode E may be stated as "rated at distance 160 according to standardized gas tracking test at . . . " with the specific test parameters being listed, wherein exemplary listed parameters may include the first and second CTWD values CTWD1 and CTWD2, and the parameters of the standardized welding process 130. Alternatively, where a standards body or industry adopts a given set of test parameters as a standard test for gas tracking, such parameters may be understood by reference to an adopted name for the test, with the stated rating being merely the measured distance 160a, in one example.

As further shown in FIG. 1, the rating may be refined at 12 and 14 in FIG. 1 by repeating the welding and measurement steps 8 and 10 for additional test welds 120b and 120c using the same electrode E, welding process 130, and workpiece 100. It is noted at this point that further test welds 120 could alternatively be created on a different, though similar, workpiece using the same process 130 with the first electrode E for refining the rating. In the illustrated example, a determination is made at 12 as to whether three test welds 120 have been created, and if not (NO at 12), the steps 8 and 10 are repeated as shown in FIGS. 3 and 5 to create and measure three test welds 120a, 120b, and 120c using the first electrode E. Thereafter at 14, the corresponding measured distances 160a–160c are averaged and the flux cored electrode E is rated according to the average of the three measured distances 160. The method 2 thus provides for objective rating of a given electrode E with respect to its effect on the likelihood of gas tracking in a welding operation.

In accordance with another aspect of the invention, the method 2 may also be employed in providing comparative analysis or ranking of a plurality of electrodes of interest, by which the relative superiority of one electrode can be objectively identified with regard to gas tracking. In this aspect of the invention, once one or more measured distances have been obtained at 10 for a first electrode E as described above, a rating may be assigned thereto at 14 and a determination is made at 20 as to whether a second electrode E is to be tested. If so (YES at 20), a second workpiece 100 is provided at 4 with a flat surface, where a second workpiece 100 may be used that is similar to the workpiece 100 used to evaluate the first electrode, or the second electrode E can alternatively be tested using a free portion of the upper surface of the first workpiece 100. In testing the second electrode E, the same setup is used at 6 and corresponding second test welds 120 are created at 8 using the same standardized welding process 130 (e.g., ideally the same CTWD linear variation, and the same values CTWD1 and CTWD2, with the only difference being the use of the second electrode E). Second distances 160 are then measured at 10 for the test weld created using the second electrode E, and the process may be repeated at 12 to obtain three measured distances 160 for the second electrode E, after which the first and second electrodes E are ranked according to the respective measured distances or the averages thereof, whereby the resulting ranking provides an objective standard to show relative superiority of one flux cored electrode E over another with respect to gas tracking in an FCAW process.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A method for rating a welding electrode for use in arc welding operations, said method comprising:

providing a workpiece with first and second ends and a substantially flat workpiece surface extending therebetween;

performing a standardized welding process using said welding electrode to create a test weld on said workpiece surface, said test weld extending from a weld beginning proximate said first workpiece end to a weld end proximate said second workpiece end, said standardized welding process providing a first contact to work distance value at said weld beginning and a second contact to work distance value at said weld end, wherein said contact to work distance varies substantially linearly from said weld beginning to said weld end with said first contact to work distance value being larger than said second contact to work distance value;

measuring a distance from said weld beginning to a point in said test weld at which gas tracking is first observed; and rating said welding electrode according to said distance.

2. A method as defined in claim 1, further comprising repeating said standardized welding process using said welding electrode to create a plurality of test welds on said workpiece surface; measuring a distance for each said test weld from said weld beginning to a point where gas tracking is observed; and rating said welding electrode according to an average of said distances.

3. A method as defined in claim 2, further comprising descaling said workpiece surface prior to performing said standardized welding process.

4. A method as defined in claim 3, wherein descaling said workpiece surface comprises at least one of grinding said workpiece surface and sandblasting said workpiece surface.

5. A method as defined in claim 3, wherein said first contact to work distance value is about one inch and said second contact to work distance value is about one half inch.

6. A method as defined in claim 3, wherein said standardized welding process provides a substantially constant arc length.

7. A method as defined in claim 3, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

8. A method as defined in claim 2, wherein said first contact to work distance value is about one inch and said second contact to work distance value is about one half inch.

9. A method as defined in claim 2, wherein said first contact to work distance value is about twice said second contact to work distance value.

10. A method as defined in claim 9, wherein said standardized welding process provides a substantially constant arc length.

11. A method as defined in claim 9, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

12. A method as defined in claim 2, wherein said standardized welding process provides a substantially constant arc length.

13. A method as defined in claim 12, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

14. A method as defined in claim 2, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

15. A method as defined in claim 1, further comprising descaling said workpiece surface prior to performing said standardized welding process.

16. A method as defined in claim 15, wherein descaling said workpiece surface comprises at least one of grinding said workpiece surface and sandblasting said workpiece surface.

17. A method as defined in claim 15, wherein said first contact to work distance value is about one inch and said second contact to work distance value is about one half inch.

18. A method as defined in claim 1, wherein said first contact to work distance value is about one inch and said second contact to work distance value is about one half inch.

19. A method as defined in claim 18, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

20. A method as defined in claim 1, wherein said first contact to work distance value is about twice said second contact to work distance value.

21. A method as defined in claim 20, wherein said standardized welding process provides a substantially constant arc length.

22. A method as defined in claim 1, wherein said standardized welding process provides a substantially constant arc length.

23. A method as defined in claim 22, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

24. A method as defined in claim 1, further comprising providing a second workpiece with first and second ends and a substantially flat second workpiece surface extending therebetween; performing said standardized welding process using a second welding electrode to create a second test weld on said second workpiece surface, said second test weld extending from a weld beginning proximate said first workpiece end to a weld end proximate said second workpiece end; measuring a distance from said weld beginning to a gas tracking point in said second test weld at which gas tracking is first observed; rating said second welding electrode according to said distance; and ranking said electrodes according to said ratings.

25. A method as defined in claim 1, wherein said welding electrode is a flux cored electrode.

26. A method as defined in claim 1, wherein said standardized welding process is a gas-shielded FCAW process.

27. A method of ranking welding electrodes, said method comprising:
providing a workpiece with first and second ends and a substantially flat workpiece surface extending therebetween;
performing a standardized welding process using first and second welding electrodes to create first and second test welds, respectively, on said workpiece surface, said test welds individually extending from a corresponding weld beginning proximate said first workpiece end to a corresponding weld end proximate said second workpiece end, said standardized welding process providing a first contact to work distance value at said weld beginning and a second contact to work distance value at said weld end of each said test weld, wherein said contact to work distance varies substantially linearly from said weld beginning to said weld end with said first contact to work distance value being larger than said second contact to work distance value, and said contact to work distance being substantially equal for said first and second test welds;
measuring a first distance for said first test weld from said weld beginning to a gas tracking point at which gas tracking is first observed;
measuring a second distance for said second test weld from said weld beginning to a gas tracking point at which gas tracking is first observed; and
ranking said first and second welding electrodes according to said first and second distances.

28. A method as defined in claim 27, further comprising repeating said standardized welding process for each said welding electrode to create a plurality of test welds for each said welding electrode on said workpiece surface; measuring a distance for each said test weld from said weld beginning to a point where gas tracking is observed; and rating each said welding electrode according to a corresponding average of said distances.

29. A method as defined in claim 27, further comprising descaling said workpiece surface prior to performing said standardized welding process.

30. A method as defined in claim 27, wherein said first contact to work distance value is about one inch and said second contact to work distance value is about one half inch.

31. A method as defined in claim 27, wherein said first contact to work distance value is about twice said second contact to work distance value.

32. A method as defined in claim 27, wherein said standardized welding process provides a substantially constant arc length.

33. A method as defined in claim 27, wherein said first and second welding electrodes are flux cored electrodes.

34. A method as defined in claim 27, wherein said standardized welding process is a gas-shielded FCAW process.

35. A method of ranking first and second welding electrodes, said method comprising:
providing a first workpiece with first and second ends and a substantially flat workpiece surface extending therebetween;
performing a standardized welding process using said first welding electrode to create a first test weld on said workpiece surface of said first workpiece, said first test weld extending from a weld beginning proximate said first workpiece end to a weld end proximate said second workpiece end, said standardized welding process providing a first contact to work distance value at said weld beginning and a second contact to work distance value at said weld end, wherein said contact to work distance varies substantially linearly from said weld beginning to said weld end with said first contact to work distance value being larger than said second contact to work distance value;
measuring a first distance from said weld beginning to a gas tracking point in said first test weld at which gas tracking is first observed;
providing a second workpiece with first and second ends and a substantially flat workpiece surface extending therebetween;
performing said standardized welding process using said second welding electrode to create a second test weld on said workpiece surface of said second workpiece, said second test weld extending from a weld beginning proximate said first workpiece end to a weld end proximate said second workpiece end, said contact to work distance being substantially equal for said first and second test welds;
measuring a second distance from said weld beginning to a gas tracking point in said second test weld at which gas tracking is first observed; and
ranking said first and second welding electrodes according to said first and second distances.

36. A method as defined in claim 35, further comprising repeating said standardized welding process for each said welding electrode to create a plurality of test welds for each said welding electrode on said workpiece surface; measuring a distance for each said test weld from said weld beginning to a point where gas tracking is observed; wherein said first and second welding electrodes are ranked according to a corresponding average of said distances.

37. A method as defined in claim 35, further comprising descaling said workpiece surface prior to performing said standardized welding process.

38. A method as defined in claim 35, wherein said first contact to work distance value is about one inch and said second contact to work distance value is about one half inch.

39. A method as defined in claim 35, wherein said first contact to work distance value is about twice said second contact to work distance value.

40. A method as defined in claim 35, wherein said standardized welding process provides a substantially constant arc length.

41. A method as defined in claim 35, wherein said first and second welding electrodes are flux cored electrodes.

42. A method as defined in claim 35, wherein said standardized welding process is a gas-shielded FCAW process.

* * * * *